T. R. GARNIER.
ANTIFRICTION BEARING FOR STAMP MILLS.
APPLICATION FILED AUG. 17, 1916.
1,228,312.
Patented May 29, 1917.
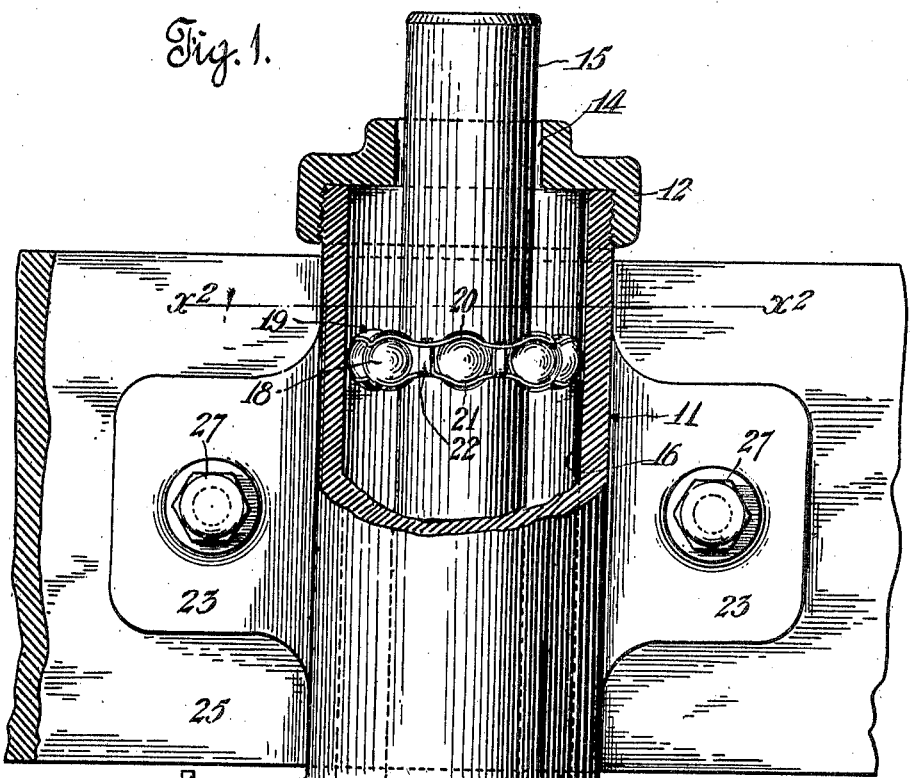
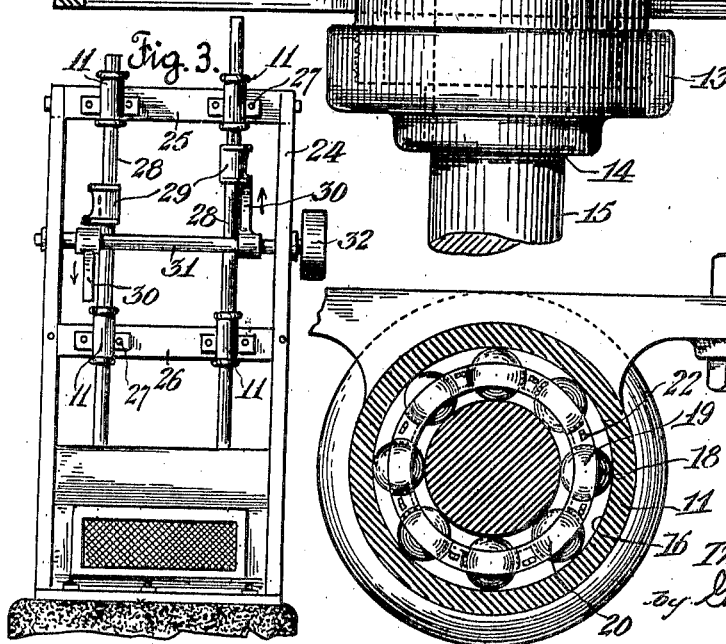
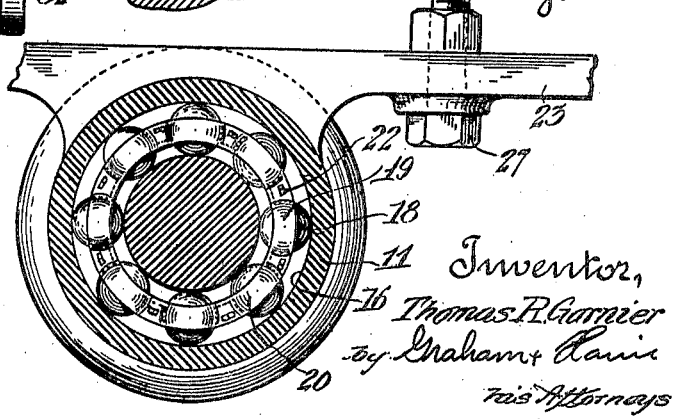
Inventor,
Thomas R. Garnier
by Graham & Davis
his Attorneys

UNITED STATES PATENT OFFICE.

THOMAS R. GARNIER, OF SOUTH PASADENA, CALIFORNIA, ASSIGNOR OF ONE-HALF TO ANNA E. STEDDOM, OF LOS ANGELES, CALIFORNIA.

ANTIFRICTION-BEARING FOR STAMP-MILLS.

1,228,312.     Specification of Letters Patent.     Patented May 29, 1917.

Application filed August 17, 1916. Serial No. 115,541.

*To all whom it may concern:*

Be it known that I, THOMAS R. GARNIER, a citizen of the United States, residing at South Pasadena, in the county of Los Angeles and State of California, have invented a new and useful Antifriction-Bearing for Stamp-Mills, of which the following is a specification.

My invention relates to the art of machine construction, and the principal object of my invention is to provide an anti-friction bearing for reciprocating rods or stems.

A further object of my invention is to provide an antifriction bearing which may be attached to stems which simultaneously reciprocate and revolve.

A further object of my invention is to provide an antifriction bearing which is especially adapted for use in stamp mills.

While my invention may be adapted to many kinds of machinery, it is particularly applicable to stamp mills, and the following description will be limited to this particular application.

Referring to the drawings, which are for illustrative purposes only:

Figure 1 is an elevation of my invention, a portion thereof being broken away to better illustrate the internal structure.

Fig. 2 is a section along the plane represented by the line $x^2$—$x^2$ Fig. 1, this plane being viewed in the direction of the arrows.

Fig. 3 is a front elevation of a stamp mill equipped with my invention:

The anti-friction bearing in the form illustrated in Fig. 1 and Fig. 2, consists of a housing 11 having an upper cap 12 and a lower cap 13 threaded thereon, these caps having openings 14 through which a cylindrical stem 15 projects. The housing 11 is bored out to form a cylindrical cavity 16, this cavity being concentric with the stem 15 so that an annular space 17 is provided between the outer surface of the stem 15 and the walls of the cavity 16. Located in this annular space 17 are a plurality of balls 18, these balls being held in alinement by means of a cage 19 which is formed of an upper member 20 and a lower member 21 secured in spaced relationship by ears 22. The parts 18 to 22 are free to turn in the annular space 17 or to move up and down in that space. Lugs 23 are provided on the housing 11. When applied to a stamp mill, as shown in Fig. 3, a frame 24 is provided with cross members 25 and 26. The housings 11 are secured by means of bolts 27 to the upper cross member 25 and the lower cross member 26. Each pair of housings 11 on the upper and lower members is in alinement, a pair of stems 28 passing through the center of the housings 11. Each of the housings 11 is provided with balls 18, and a cage 19, as previously explained. Secured on each of the stems 28 are tappets 29, these tappets being raised by cams 30 carried by a shaft 31 which is driven by a pulley 32 from any convenient source of power. The parts 28 to 31 being common to standard forms of stamp mills, no particular description of them is necessary.

The method of operation is as follows:

The shaft 31 being turned, the cams 30 alternately raise the tappets 29, lifting the stems 28 and dropping them in accordance to standard practice in stamp mills. As the stems 28 slide in the housings 11, the balls 18 with their cages 19 roll up and down on the stems with comparatively little friction. As the cams 30 slide across the tappets 29, the tappets are turned so that the stems 28 are simultaneously raised and turned. The balls 18 therefore move in a spiral line inside the housing 11 on the upstroke and drop in a straight line on the down stroke.

In the standard form of stamp mill there may be a considerably greater number of stems than in the form shown. The particular advantage of my invention as applied to a stamp mill lies in the fact that oil can be dispensed with, the stems being run dry, and there is no danger of oil falling into the material being treated, and thereby setting up mechanical or chemical reactions which are undesirable.

I claim as my invention:—

An anti-friction bearing for a cylindrical stem comprising a housing having a cylindrical cavity therein; an upper cap threaded on said housing in such a manner as to close the upper end of said cavity, said cap having a central opening through which said stem extends; a lower cap threaded on said housing in such a manner as to close the lower end of said cavity, said cap having a central opening through which said stem extends; a series of balls surrounding said stem of such a size as to aline said stem centrally in said cavity; and a cage so formed as to hold said balls in the proper relationship with each other and with said stem and cavity, said balls and cage being free to slide or rotate inside said cavity.

In testimony whereof, I have hereunto set my hand at Los Angeles, California, this 9th day of August, 1916.

THOMAS R. GARNIER.